US007702784B2

(12) United States Patent
Berstis et al.

(10) Patent No.: US 7,702,784 B2
(45) Date of Patent: *Apr. 20, 2010

(54) DISTRIBUTING AND GEOGRAPHICALLY LOAD BALANCING LOCATION AWARE COMMUNICATION DEVICE CLIENT-PROXY APPLICATIONS

(75) Inventors: Viktors Berstis, Austin, TX (US); John Daniel Sieron Bethencourt, Mt. Horeb, WI (US); Kevin Blake Damm, Sanford, NC (US); Robert Glenn Deen, San Jose, CA (US); Matthew Hammer, Stoughton, WI (US); James H. Kaufman, San Jose, CA (US); Tobin J. Lehman, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 7 days.

This patent is subject to a terminal disclaimer.

(21) Appl. No.: 12/172,473

(22) Filed: Jul. 14, 2008

(65) Prior Publication Data
US 2008/0270605 A1 Oct. 30, 2008

Related U.S. Application Data

(63) Continuation of application No. 10/821,050, filed on Apr. 8, 2004, now Pat. No. 7,428,588.

(51) Int. Cl.
*G06F 15/173* (2006.01)
(52) U.S. Cl. .................... 709/224; 709/203; 709/246; 718/105

(58) Field of Classification Search ................. 718/105; 709/223–224, 232, 235, 203, 246
See application file for complete search history.

(56) References Cited

U.S. PATENT DOCUMENTS

| 5,860,137 A | * | 1/1999 | Raz et al. ................. 711/202 |
| 6,021,268 A | | 2/2000 | Johnson ................. 395/500.24 |

(Continued)

OTHER PUBLICATIONS

IBM developer Works, OptimalGrid—autonomic computing on the Grid, James H. Kaufman; Tobin J. Lehman; Glenn Deen; and John Thomas, Jun. 2003.

(Continued)

*Primary Examiner*—Philip B Tran
(74) *Attorney, Agent, or Firm*—Yee & Associates, P.C.; William H. Steinberg; Rudolf O. Siegesmund

(57) ABSTRACT

A method and system for balancing server work load for cellular phone client-proxy applications in an environment where the clients change position within a given geographic area is disclosed. The method comprises the steps of mapping, monitoring, automatically re-mapping the system when required, updating a map address book, and updating a client address book. The system has a mapping system and a communication system connected to a plurality of servers, proxy servers and applications by an internal network. The proxy servers are connected to a plurality of clients by the Internet. If a threshold is exceeded, the monitoring program sends a message to a mapping program. Upon receipt of the message, the mapping program uses a rules engine to calculate a new map graph to remove load from an overloaded server (or servers) and to adjust communication requirements for data by reconfiguring partitions.

40 Claims, 9 Drawing Sheets

U.S. PATENT DOCUMENTS

| | | | |
|---|---|---|---|
| 6,349,091 B1 | 2/2002 | Li | 370/238 |
| 6,473,597 B1 | 10/2002 | Johnson | 455/63 |
| 6,574,477 B1 | 6/2003 | Rathunde | 455/453 |
| 6,580,981 B1 | 6/2003 | Masood et al. | 701/29 |
| 6,601,084 B1 | 7/2003 | Bhaskaran et al. | 709/105 |
| 6,941,236 B2* | 9/2005 | Huelsbergen et al. | 702/66 |
| 2004/0103079 A1* | 5/2004 | Tokusho et al. | 707/1 |

OTHER PUBLICATIONS

IBM, Transcoding: Entending e-business to new environments, Britton et al., Sep. 22, 2000.

Lee et al., "A Self-Adjusting Data Distribution Mechanism for Multidimensional Load Balancing in Multiprocessor-Based Database Systems," Information Systems vol. 19, No. 7, pp. 549-567, 1994.

Ma et al., "A Scalable Parallel Cell-Projection Volume Rendering Algorithm for Three-Dimensional Unstructured Data", IEEE 1997, pp. 1-10.

Feng et al., "A Parallel Hierarchical Radiosity Algorithm for Complex Scenes," Proceedings IEEE Symposium on Parallel Rendering (PRS) '97), IEEE Computer Society Technical Committee on Computer Graphics in cooperation with ACM SIGGRAPH pp. 71-79, 1997.

Hassen et al., "A Task-and Data-Parallel Programming Language Based on Shared Objects," ACM Transactions on Programming Languages and Systems, vol. 20, No. 6, Nov. 1998, pp. 1131-1170.

Newtons Telecom Dictionary, Proxy server definition, Published 1998, p. 552.

Mauve, 2002. "A generic proxy system for networked computer games". In Proceedings of the 1st Workshop on Network and System Support For Games (Braunschweig, Germany, Apr. 16-17, 2002). NetGames '02. pp. 1-4, ACM, New York, NY, 25-28. 001= http://doi.acm.org/10.1145/566500.566504.

Andert, "A Simulation of Dynamic Task Allocation in a Distributed Computer System," Proceedings of the 1987 Winter Simulation Conference, 1987, pp. 1-9.

"User Interface for a Parallel File System," IBM Technical Disclosure Bulletin, vol. 37, No. 11, Nov. 1994, pp. 477-480.

"A Data Modeling Technique Used to Model Data Used in Task Analysis," Research Disclosure—Mar. 1998/297. 1 page.

Kaufman et al., "The Almaden SmartGrid project Autonomous optimization of distributed computing on the Grid," IEEE TFCC Newsletter, vol. 4, No. 2, Mar. 2003, pp. 1-21.

A multi-server architecture for distributed virtual Walkthrough ACM VRST'02, Nov. 2002 Hong Kong, pp. 163-170. http://delivery.acm.org/1.1145/590000/585768/p163-ng.pdf?key1 =585768 &key2=0554824911&coli=GUIDE&dl=GUIDE &CFID=41712537&CFTOKEN=50783297.

Duong et al; "A dynamic load sharing algorithm for massively multiplayer online games" published Sep. 28, 2003-Oct. 1, 2003. pp. 131-136 http://ieeexplore.ieee.org/iel5/8945/28322/01266179.pdf?tp=&arnumber=1266179&isnumber=28322 http://ieeexplore.ieee.org/xpi/absprintf.jsp?arnumber= 1266179.

* cited by examiner

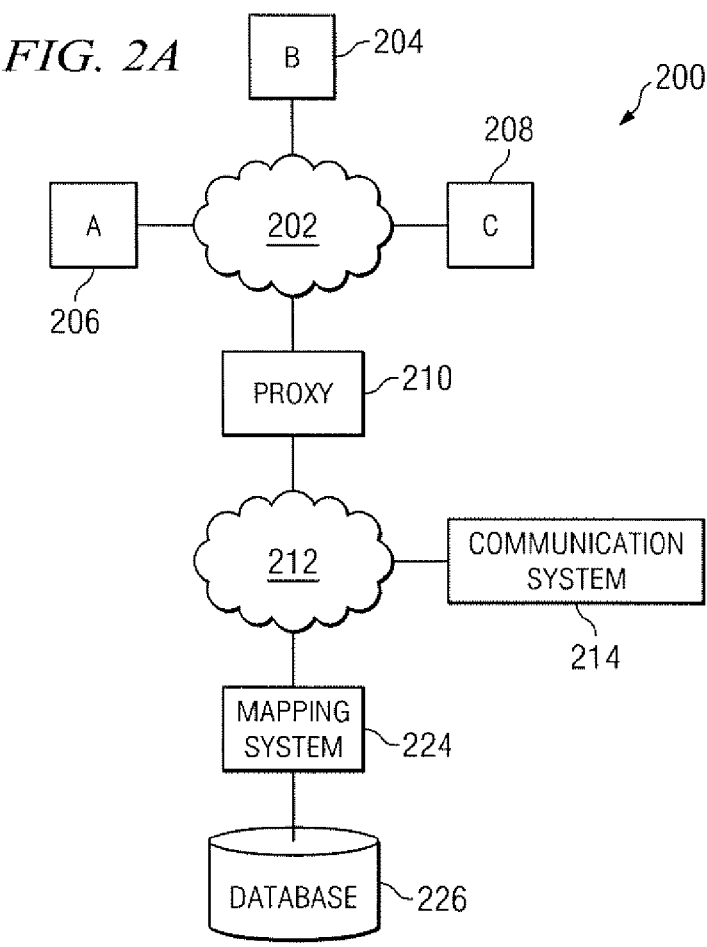
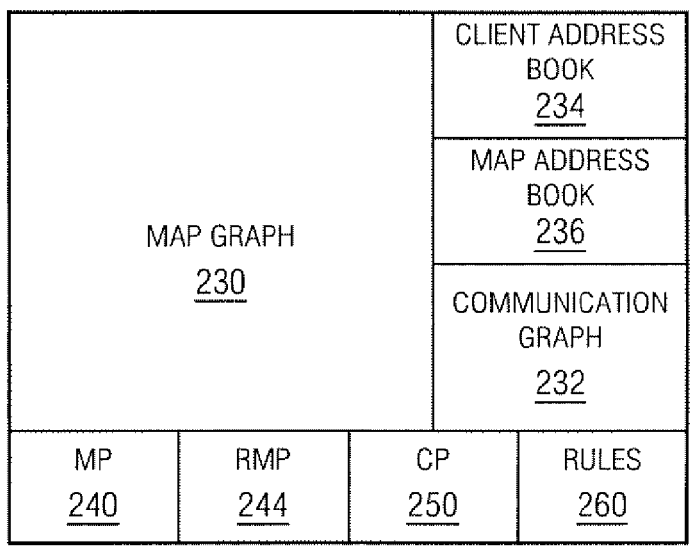

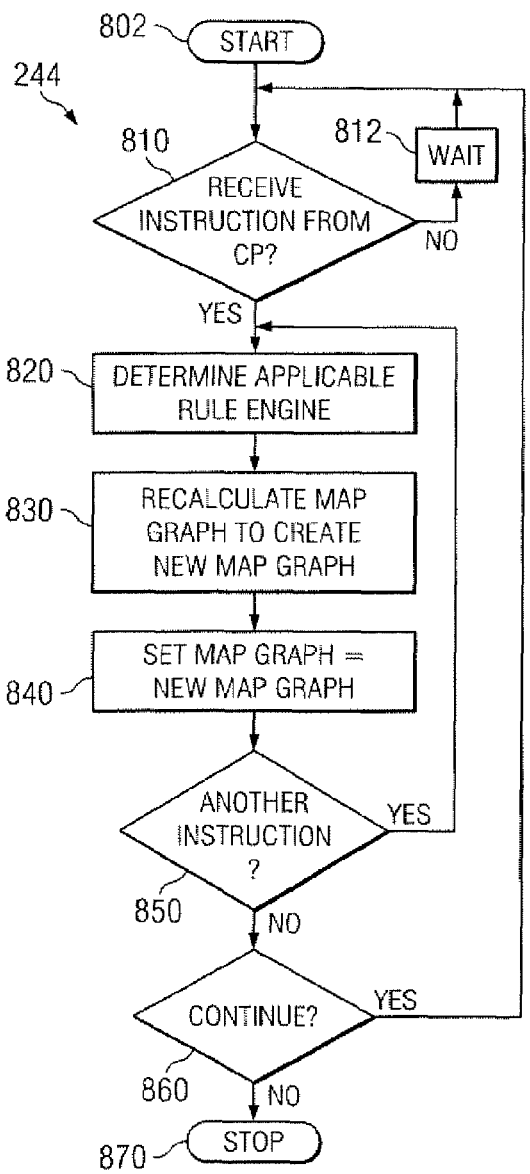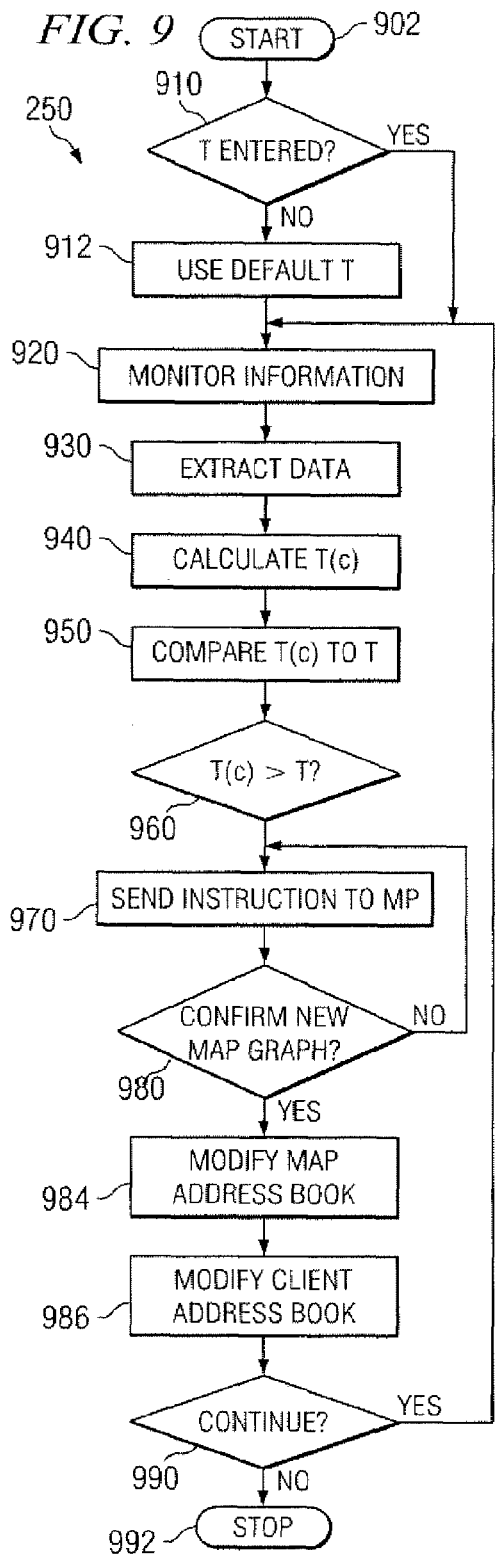

DISTRIBUTING AND GEOGRAPHICALLY LOAD BALANCING LOCATION AWARE COMMUNICATION DEVICE CLIENT-PROXY APPLICATIONS

CROSS-REFERENCE TO RELATED APPLICATION(S)

This application is a continuation application of U.S. utility patent application entitled "Method for Distributing and Geographically Load Balancing Location Aware Communication Device Client-Proxy Applications" filed on Apr. 8, 2004 and accorded Ser. No. 10/821,050 now U.S. Pat. No. 7,428,588 and claims priority therefrom.

FIELD OF THE INVENTION

The present invention relates generally to location aware device client-proxy applications for a client, and specifically to a method for balancing server load by re-mapping server assignments.

BACKGROUND OF THE INVENTION

In a location aware device system, such as a cellular telephone system, new services are being offered beyond simple calls, messaging and internet connectivity. For example, these new services may require running a proxy on a server for each telephone user which may hold the state of one or more application sessions, maintain the sessions through periods of wireless disconnection, and provide transcoding appropriate for the given phone type or location aware device. For example, transcoding may be required when clients want to check accounts, access information and make purchases with their cellular phones, personal digital assistant, or some other location aware device. Web applications designed to take advantage of rendering capabilities of desktop browsers do not generally render effectively on the small screens of cellular phones or personal digital assistants. Some devices have little or no graphics capability, or require different markup languages, such as Wireless Markup Language (WML) for text presentation. Transcoding is technology for adapting content to match constraints and preferences associated with specific environments. For a description of dynamic transcoding methodologies, see "Transcoding: Extending e-business to new environments," Britton et al., *IBM Systems Journal*, Vol. 40, No. 1, 2001.

Servers providing the above described services are assigned based upon geographic area. The problem is that servers handling these functions can become overloaded when too many clients use these services in a geographical area.

FIG. 1A depicts an example of a geographic map showing a road network and three cities. Cellular phone users will travel within the geographic area for such reasons as commuting to work and attending events in halls or sports arenas. Such travel may concentrate a larger than normal number of cellular phone users in a relatively small geographic area. Furthermore, usage may increase during lunch hours or during breaks in concerts or half-times at athletic events. In addition, not only will the number of cell phone users increase within the geographic area, but also demands for delivery of information from available information delivery subsystems will increase. For the foregoing reasons, telecommunication servers assigned to one geographic area may have significant increases and decreases in usage during different periods of time due to the migration of cellular phone users within the geographic area. It is desirable to have a means for automatically changing the geographic boundaries of the areas assigned to servers to more evenly distribute the demands on the servers in the system.

Balancing of server workload may be accomplished by moving the geographic boundaries of server assignments. U.S. Pat. No. 5,630,129 (the '129 patent) discloses the use of tiles and tiling to balance loads within "neighborhoods." The '129 patent states that the method steps are referred to as "tiling" and that "[i]n tiling, the definition of a neighborhood is extended to include all processors whose elements are neighbors of elements in the center processor. Neighborhood is defined as "a processor at the center of a circle of some predetermined radius and all other processors within the circle." Processors in a neighborhood are "balanced with respect to each other using local (as opposed to global) performance measurements." (4:9-24). In addition, the '129 patent states "the tiling method redistributes the work so that processors containing elements on the domain boundary have fewer elements than those in the interior of the domain." (11:61-64).

In addition, servers handling telecommunication functions require intra-system communications between servers to update data based on changes in client locations and application usage. For example, as a client moves from one geographic area to the next, the client may be assigned to a new server and information regarding the client may be relevant to other location aware device users and to other applications. Existing cellular telephone systems are adept at transferring clients from one geographic area to another. But a solution to automatic scalability must also address synchronization of information between servers. Moreover, the need for distributing demand on servers in a telecommunications system can be extended to include all location aware communication devices from which clients may access applications while changing locations within a geographic area.

One area where analogous development regarding user movement has taken place is in the implementation of multi-player on-line games. Multi-player on-line games require updated data for each user location and application that a user may call upon during game play. FIG. 1B is a depiction of a game scenario in which three players interact. As shown in FIG. 1B, players A, B and C initially begin in areas where they do not have visual contact with each other in the virtual world map. But after players A, B and C move into the upper right corner of the virtual world map, players A and C are in virtual line of sight with each other and players B and C are in virtual line of sight with each other. Depending on the game type, players A, B and C may call upon the application they are participating in to perform various actions. The complexity of calculations and server demand increases as the number of players increases. In addition, as the number of players in a portion of the game area increases, the number of calculations called upon to be made increases.

New games attempt to avoid server overload by having dynamic boundaries. However, in these implementations, there are many places in the game space where players can simultaneously see into one or more other servers' area of control. Thus, the servers need to synchronize information with their neighbors. Furthermore, these implementations use a "grey" area around the partitioning boundaries where both servers partially "own" the objects and the data is mirrored between the servers. The mirroring of data is an attempt to reduce the work involved in handing off an object to the next server when the object leaves the grey area. This mirroring, though, further increases synchronization problems and greatly complicates the server code. These techniques are described in "Massively Multi-player Game Development" edited by Thor Alexander 2003 (ISBN 1-58450-243-6). The book states the many difficulties with this approach, yet states that it is necessary to achieve scalability. For further information see "Practical Grid Computing for Massively Multi-player Games" by Levine et al. 2003 (ISBN 1-58450-292-4).

Thus, a method for dynamically reassigning server boundaries without using "grey areas" is needed. Such a method should have automatic scalability so that it can adapt to any number of clients (for example 10 to 10,000); should allow clients to be reassigned to a different server in order to balance loads; and should be able to dynamically distort the server-to-geography mapping in response to usage "hot-spots" without increasing the time required for a signal to travel from one point on the network to another.

As discussed above, multi-player virtual game developments may be examined for solutions to load-balancing problems for clients using location aware devices to access information systems. However, in a multi-player game environment, a client is assigned statically to a game server for the life of the game. Clients cannot move from one server to the next without a substantial change to the server infrastructure. It would be advantageous to combine the use of proxy servers, as known in the telecommunications art and in the virtual game art, to a method for dynamically distorting server-to-geography mapping as discussed above, so that the substantial changes to the server infrastructure can be avoided.

SUMMARY OF THE INVENTION

The present invention, which meets the needs stated above, is a method and system for balancing server work load for location aware device client-proxy applications in an environment where the clients change position within a given geographic area. The method comprises mapping a system, monitoring the system, automatically re-mapping the system when required, updating a map address book, and updating a client address book. The system has a mapping system and a communication system which are connected through an interim network to a plurality of servers, proxy servers and applications. The proxy servers are connected to a plurality of clients by the Internet.

The mapping system comprises a mapping program, a re-mapping program, a map graph, and a rules file. The mapping program establishes a map graph corresponding to the geographic area. The map graph contains data and communication dependencies for the system. The mapping program uses a template to assign cell, collection, partition, and communication requirements for data in a reconfigurable and scalable relationship. The re-mapping program re-calculates the map graph when instructed by a communication program, as discussed below.

The communication system comprises a communication program, a distributed communication graph, a map address book, and a client address book. The communication program monitors the data in the communication graph, calculates a threshold T(c) for server load, and compares the value T(c) to a pre-established threshold T. If T(c) is greater than T, the communication program sends an instruction to the re-mapping program. Upon receipt of the instruction, the re-mapping program uses the rules engine to calculate a new graph. The re-mapping program configures partitions to remove load from an overloaded server (or servers) and to adjust data communication requirements accordingly. The re-mapping program adjusts the load by re-assigning cells from a server operating above threshold to a neighboring server that is not above threshold. New communication dependencies, based upon the new assignment, are also reflected in the new map graph. The reconfiguration of partitions and adjustment of communication requirements is performed according to instructions from the rules engine.

Finally, the communication program modifies the client address book to change the client assignments for clients located in the new partitions. The client address is modified so that the client will be assigned to the server for the partition corresponding to the geographic location in which the client is located. The modified client address book thereby enables the proxy server to go to the new server for information regarding the reassigned client. Because the communication requirements have been modified in the new map graph, the corresponding server assignment has been modified in the map address book, and the client proxy assignments have been modified in the client address book, the proxy will only obtain essential information for the client.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2A is an illustration of a client-proxy telecommunication system (CPTS) with dynamic load balancing using a mapping system and a communication system;

FIG. 2B is an illustration of a CPTS memory;

FIG. 8 is a flow chart of the re-mapping process; and

FIG. 9 is a flow chart of the communication program.

DETAILED DESCRIPTION OF THE PREFERRED EMBODIMENT

Figure 1A:
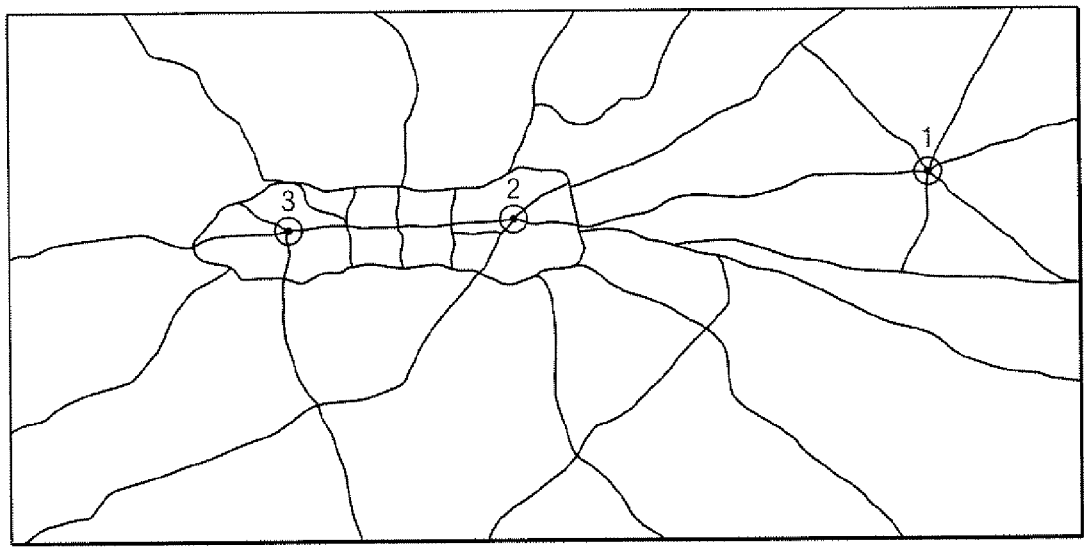
FIG. 1A depicts an example of a geographic map.

As used herein, the term "application" shall mean a program that is available on an internal network in the system.

As used herein, the term "cell" shall mean the smallest indivisible unit in the mapping system.

As used herein, the term "client" shall mean an individual wireless information device user or virtual computer game player.

As used herein, the term "client address book" shall mean an array of data assigning a client to the proxy server corresponding to the actual or virtual geographic area in which the client is located.

As used herein, the term "client proxy telecommunications system" (CPTS) shall mean a system in which clients receive data through a proxy server and the proxy server is connected to a network having a scalable mapping system and a scalable communications system.

As used herein, the term "collection" shall mean a contiguous group of cells wherein the group of cells has core cells and edge cells and wherein the cells are neighbors to each other.

As used herein, the term "computer" shall mean a machine having a processor, a memory, and an operating system, capable of interaction with a user or other computer, and shall include without limitation desktop computers, notebook computers, personal digital assistants (PDAs), servers, proxy servers, handheld computers, cellular phones, and similar devices, including without limitation location aware devices.

As used herein, the term "communication dependencies" shall mean data that is required to be received from or sent to a cell, collection or partition.

As used herein, the term "communication program" shall mean a program to monitor data from the communication graph, compare the data to a threshold value, send a message to the re-mapping program in response to the threshold being exceeded, and, update a map address book and/or a client address book in response to the re-mapping program re-calculating the initial graph.

As used herein, the term "communication node" shall mean the grid nodes assigned to contain data being reported during edge communications.

As used herein, the term "data" shall mean an item of information and shall include without limitation objects having data, methods and pointers to neighboring cells and code and processes used by a neighboring cell.

As used herein, the term "dynamic behavior" shall mean actions by a client including movement over a geographic area and activation of applications using a location aware device.

As used herein, the term "edge communications" shall mean data transmitted from the edge cells of one collection or partition to the edge cells of an adjacent collection or partition.

As used herein, the term "graph" shall mean a data structure for the system.

As used herein, the term "grid" shall mean a collection of nodes connected by a network.

As used herein, the term "grid node" shall mean an independent computing system connected by a network.

As used herein, the term "location aware communication device" shall mean a communication device such as a cellular phone or personal digital assistant (PDA) that allows a determination of the device user's geographic location by integration with a global positioning system (GPS), by integration with a cellular cell detection system or by integration with some other electronic means for determining geographic location when the location aware communication device is activated by the user.

As used herein, the term "map address book" shall mean an array of data showing the proxy server assigned to a partition corresponding to a geographic area and the client assigned to that proxy server: the map address book is updated whenever the map graph is re-calculated.

As used herein, the term "map graph" shall mean a graph that has been scalably partitioned by a mapping program.

As used herein the term "mapping program" shall mean a program that creates a map graph by initially assigning nodes on a grid, determining the number of partitions and applying a template to the graph so that there is a correlation between cell geography and the servers assigned to them.

As used herein, the term "neighboring" shall mean a geographic relationship between a cell, collection, or partition and each of the cells, collections, or partitions that surround and are contiguous to that cell, collection or partition.

As used herein, the term "neighboring server" shall mean a server handling neighboring cells or collections of cells.

As used herein, the term "node" shall mean a device connected to a network that can communicate with other network devices.

As used herein, the term "partition" shall mean a logical grouping of collections assigned to a server.

As used herein, the term "proxy server" shall mean a server dedicated to designated clients that obtains information from a server for transmission to the client.

As used herein, the term "re-mapping program" shall mean a program that re-calculates a map graph according to instructions from a rules engine when instructed by a communication program.

As used herein, the term "rules" shall mean a pre-determined set of instructions used by the mapping program to calculate the map graph and to re-calculate the map graph when instructed by the communications program.

As used herein, the term "server" shall mean a computer that responds to communications from a proxy server and that is in the system as a compute node of the map graph.

As used herein, the term "system" shall mean a cellular phone system employing proxy servers between the servers and the clients for a given geographic area.

As used herein, the term "template" shall mean a pre-configured map comprising cells, collections and partitions applied to a graph by a mapping program to create a map graph.

As used herein, the term "threshold" shall mean a value "T" selected from the range of possible values for a variable $T(c)$ where the values of $T(c)$ are a function of a formula for measuring the load on the servers in a client proxy telecommunications system, the values for $T(c)$ are calculated from data in a communication graph, and the value T is selected so that when $T(c)$ is greater than T, a map graph will be re-calculated to redistribute the server load: T may also be calculated by an optimization formula in the event a system administrator has not selected and entered a value for T.

FIG. 2A depicts telecommunications system 200, which is shown by way of example and not by way of limitation. Telecommunication system 200 has internal network 212 connecting proxy server 210 to communication system 214 and to mapping system 224. Mapping system 224 is connected to database 226. Proxy server 210 is connected to client A 106, client B, 104 and client C 108 by Internet 102.

Figure 1B:
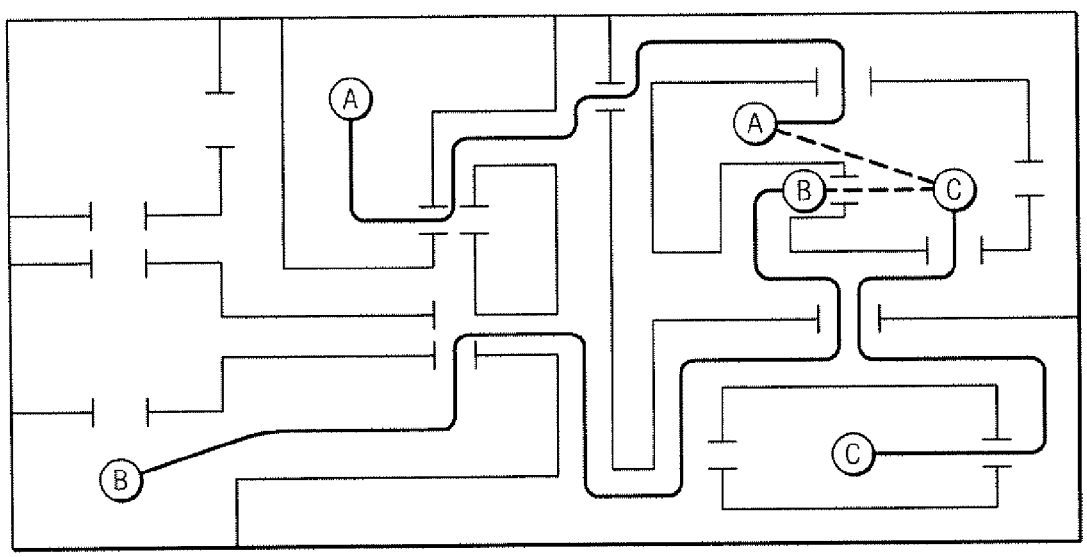
FIG. 1 depicts an example of game scenario.

FIG. 2B depicts memory 200 containing telecommunications system 100, map graph 230, client address book 234, map address book 236, communication graph 232, mapping program (MP) 240, re-mapping program (RMP) 244, communication program (CP) 230, and rules 260. Memory 200 may be located in one machine or may be distributed within internal network 112 (See FIG. 1). Communication system 114 comprises CP 230, distributed communication graph 232, map address book 234, and client address book 236. Mapping system 124 comprises mapping program 240, re-mapping program 244, map graph 230, and rules engine 260. In one embodiment, communication program 230 may be written in Java® for use in conjunction with a database such as Tspaces in the same manner as Linda®, Paradise®, Javaspaces®, GigaSpaces®, IntaSpaces®, and Ruple®. Alternatively, the database may be a distributed Linda® system.

Mapping system 124 includes rules engine 260, which makes decisions for re-calculating a map graph when required by communication system 114. As will be discussed further below, communication system 114 requires mapping system 124 to re-calculate a map when a threshold has been exceeded. Mapping program 240 creates a map graph comprising cells, collections and partitions. The cells, collections, and partitions are the building blocks of mapping system 124.

Figure 3A:
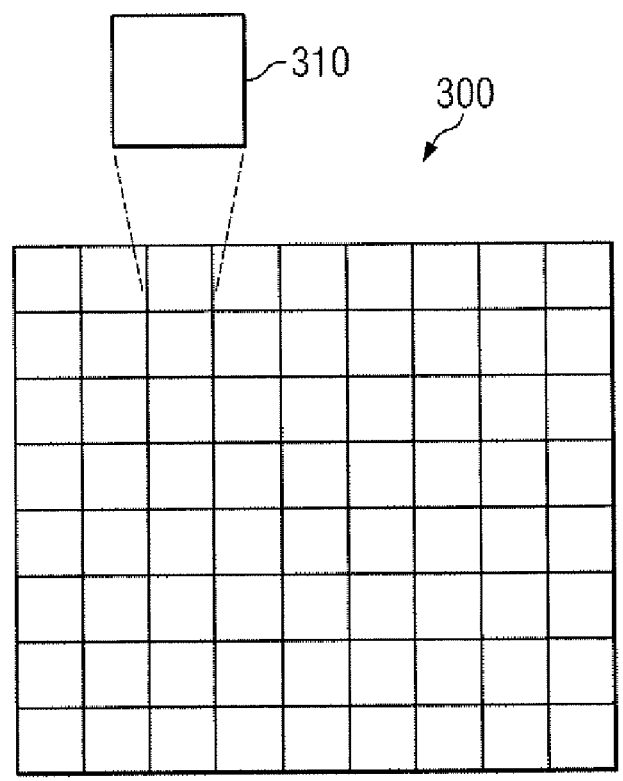
FIG. 3A is an illustration of a cell and a collection of cells.

FIG. 3A depicts cell 310. A cell may represent a node on the map graph, and may contain data, methods, and pointers to other cells. The user implements a small set of methods defined or required by an abstract cell class. The methods describe the connectivity of the cell with its neighbors and specify the calculations to be performed by the cell using local data and information obtained from connected neighbors. A typical cell object is very small and requires little memory and miniscule computational power to execute.

Cell 310 is contained within collection 300 which comprises a plurality of cells connected to each other for data communication. In some situations, a collection could consist of only one cell. Each grid node handles one or more collections at a time. The collection object is key to the system data structure. A collection object is an array of cells that tracks all communication dependencies for the collection.

Figure 3B:
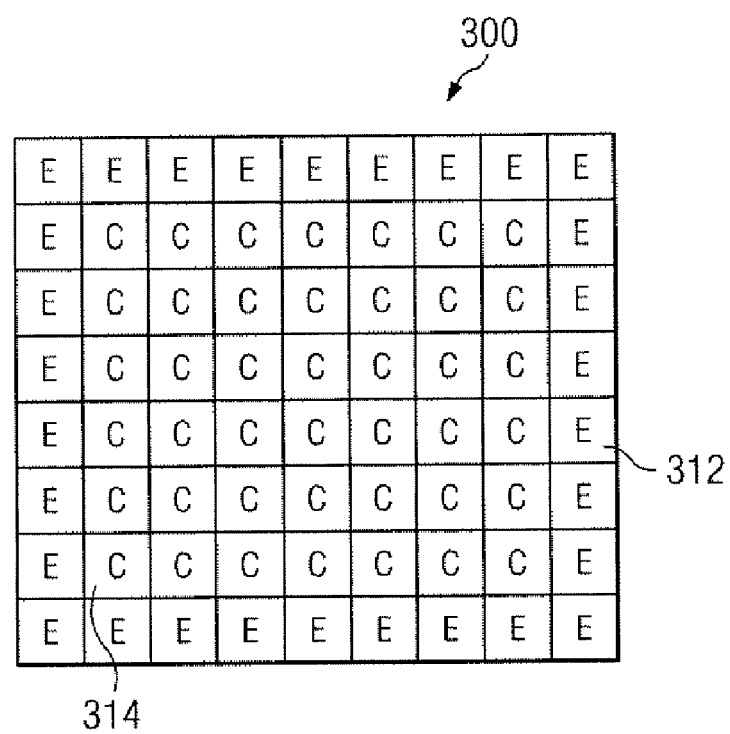
FIG. 3B is an illustration of a collection of cells, edge cells and core cells.

Each cell can communicate with multiple neighboring cells. Therefore, the collections and the partitions also share data with neighboring collections and partitions. Cells are grouped together into collections that are not changed in size after formation. Collections, in turn, are dynamically assigned to a partition for execution on a common grid node. FIG. 3B shows cells marked with an E or a C. Cells marked with an E are edge cells. Cells marked with a C are core cells. The cells within a collection (i.e., the core cells and the edge cells) communicate with one another directly using in-memory communication such as Java object references. The edge cells will communicate with the edge of neighboring collections using in-memory communication if they are on the same partition. If the collections are not within the same partition, then data is transmitted over the existing network infrastructure. For object-oriented programming, copies of entire objects (i.e., the cells themselves) can be sent from the edge cells of one collection to the edge cells of another collection. Thus, when a cell communicates with a neighboring cell, the cell has access to the code or processes used by the neighboring cell. Because the transmitted objects have data, methods and pointers to neighboring cells, the communicating cell will also know the neighboring cells of its neighboring cells. The mapping program follows rules to minimize the amount of network communication required.

Figure 3C:
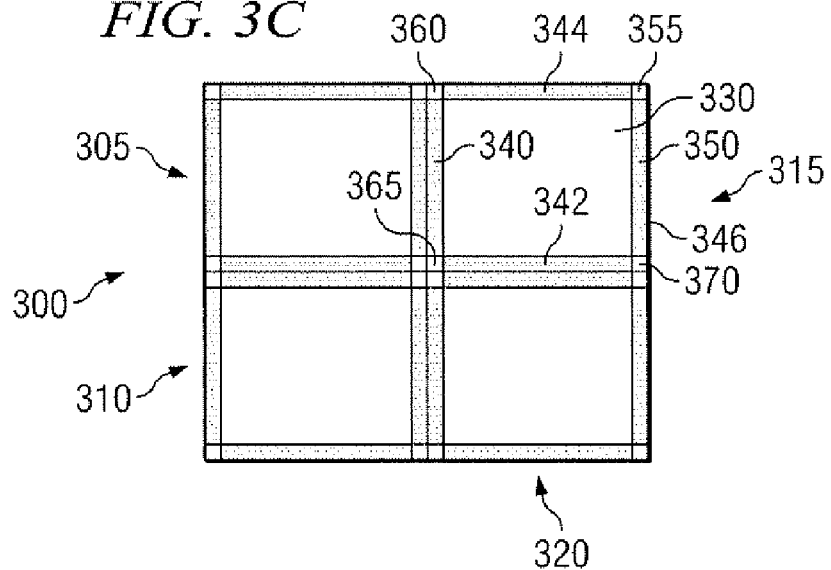
FIG. 3C is an illustration of a partition comprising four collections of cells having edge cells and core cells.

FIG. 3C shows collections 305, 310, 315, and 320. Collection 315 is shown having edge collections 350, 344, 340, 342, 360, 355, 365 and 370. Core 330 is an array of pointers to those cells in the collection that have no connection to cells outside the collection. Consequently, the computation within core 330 can be performed without waiting for communication between collections. Edge collections have a common set of communication dependencies. Edge collections 350, 344, 340, 342, 360, 355, 365, and 370 are grouped according to their communication dependencies. These collections and communication dependencies are defined in a template used by mapping program 240. Consequently, re-mapping requires minimal computations.

Mapping program 240 uses a template to determine the spatial boundaries for all collections. The template automatically partitions a graph into a regular or describable irregular configuration to create a map graph. Thus, a system administrator need not perform any manual steps to partition a map graph. The system administrator chooses the segmenting scheme and submits the graph. Using the template, mapping program 240 divides the graph into fixed volumes or areas and predefines the relationship between partitions.

Figure 3D:
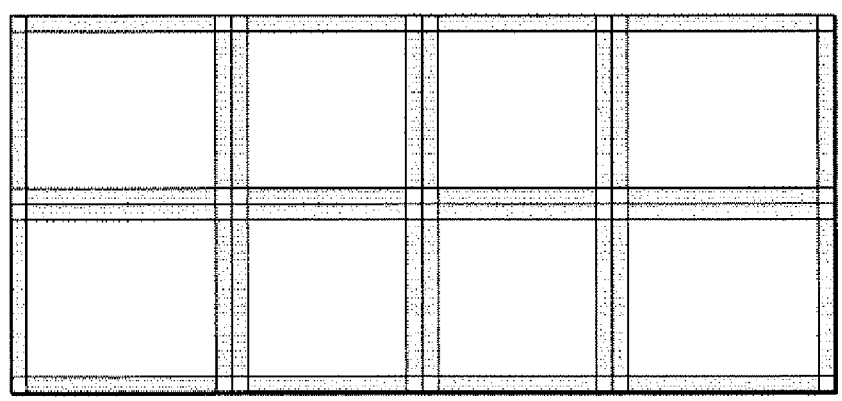
FIG. 3D is an illustration of a template.
Figure 3E:
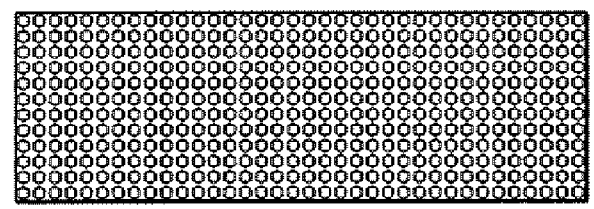
FIG. 3E is a depiction of graph data.
Figure 3F:
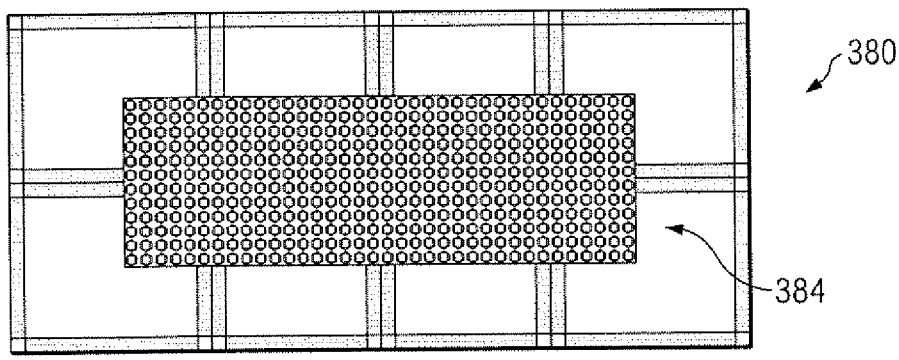
FIG. 3F is a depiction of graph data applied to the template.
Figure 3G:
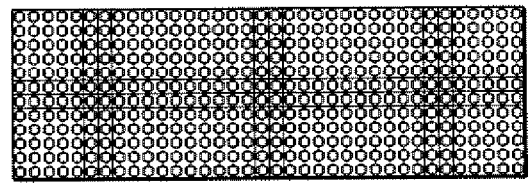
FIG. 3G is a depiction of the graph data in a map graph.

FIG. 3D depicts template 380. Template 380 has eight empty collections. FIG. 3E depicts graph 384. FIG. 3F depicts the application of template 380 to graph 384. FIG. 3G depicts map graph 390 formed by the application of template 380 to graph 384.

Figure 4:
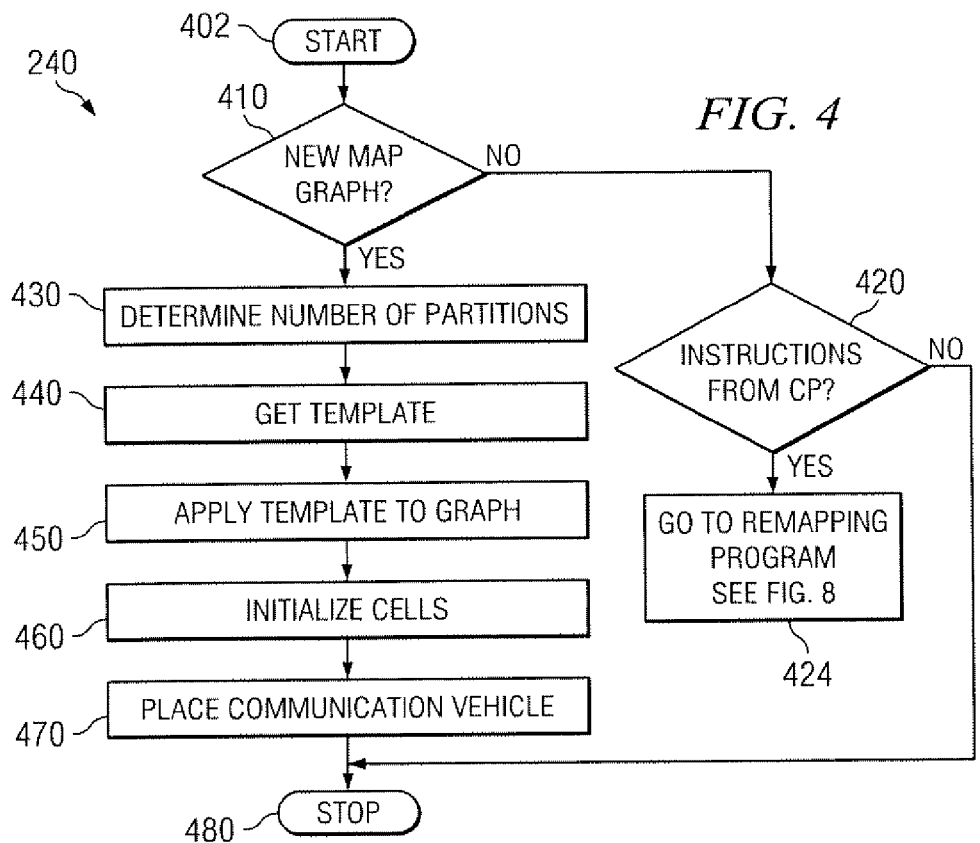
FIG. 4 is a flow chart of the mapping process.

FIG. 4 depicts a flow chart for mapping program (MP) 240. MP 240 applies a template, such as template 380 (see FIG. 3D), to a graph to create map graph 230 (see FIG. 2). MP 240 starts (402) and determines whether a new map graph is to be created (410). If a new map graph is not being created, MP 240 determines whether instructions have been received from communication program (CP) 250 (see FIG. 2). If instructions have been received from CP 250, mapping program goes to re-mapping program (RMP) 244 (see FIG. 8) (424). If instructions have not been received from CP 250, MP 240 goes to step 480. If a determination is made that a new map graph is to be created, MP 240 determines the number of partitions (430), obtains a template for that number of partitions (440) and applies the template to the graph (450). The template creates empty collections in the entire map, partitions the space represented by the map, and determines the edges through spatial regions with coordinates. MP 240 then initializes the cells (460) and incorporates the communication vehicle to be used for the partitions (470). Incorporating the communication vehicle includes writing each partition to a communication graph 232 by sending a vector or tuple. Communication vehicles include, without limitation, wrappers and may be interchangeable. The map graph created by applying the template to a graph may be layered with a first layer having the cell-to-collection assignments, the second layer having the cell-to-partition assignments, the third layer having the communication-requirement-to-partition assignments, and the fourth layer having the partition-to-server assignments. MP 240 stops (480).

By way of illustration, given a two-dimensional map composed of 2 million two-dimensional cells, MP 240 may create 800 collections of 2500 cells each. A partition of 16 collections would have 40,000 cells. With an even distribution to 50 servers, each server would be assigned 40,000 partitions. If the map graph were to be re-calculated, server assignments would be changed with respect to collections containing 2500 cells. Faster networks (or shorter communication latency) might allow more servers with smaller partitions, while larger memories of servers and a slower network might require fewer but larger partitions.

Figure 5A:
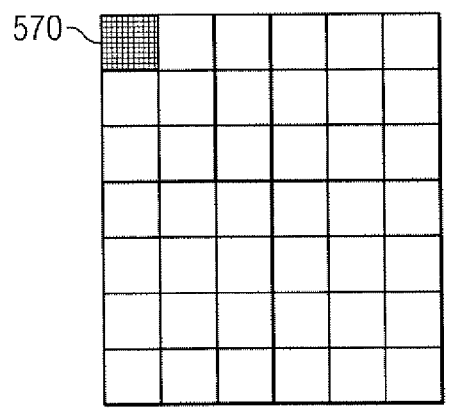
FIG. 5A is a depiction of partitions.
Figure 5B:
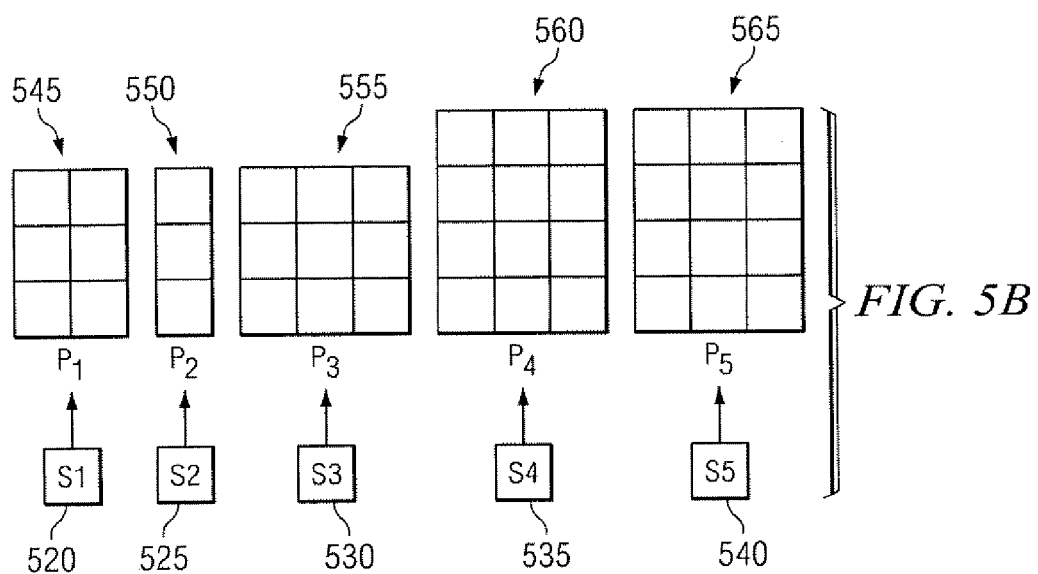
FIG. 5B is a depiction of the partitions assigned to servers.

FIG. 5A depicts map graph 230. The map graph is divided into many cells such as cell 510. Based on the size of the map graph and the available servers, the cells are assigned to collections. Each collection is a fixed number of cells. Mapping program has servers S1 520, S2 525, S3 530, S4 540, and S5 545 to process map graph 230. Based on the capability of each server available at the beginning of processing, map program 240 assigns a partition to each server. As shown in FIG. 4B, S1 520 receives P1 545 with six collections. S2 525 receives P2 550 with three collections. S3 530 receives P3 555 with nine collections. S4 535 receives P4 560 with twelve collections. S5 540 receives P5 565, also with twelve collections. This is the initial mapping of map graph 230.

The communication system employs a distributed communication graph in which data is communicated via tuples or vectors of objects. The optimal ratio of communication graph nodes to partition nodes depends on the system. Factors such as the amount of data being reported must be considered. This is a configuration step that may be automated by use of a first optimizing routine with the mapping program. If the system is not partitioned already, then the first optimizing routine would be run at program load time. The first optimizing routine is run when the map is initially being assigned to nodes on the grid, and determines the optimal number of grid nodes needed to build the map graph. A second optimizing routine automatically determines the number of partitions by determining the number and size of all cells and the number of grid nodes available and by using algorithms to predict the optimal number of grid nodes to use, or alternatively, determines some other number of partitions by predicting the computation time.

The actual communication mechanisms employed for partition communication are interchangeable and include, without limitation, wrappers. Although the default communication mechanism is a communication server, any other communication infrastructure, such as a peer-to-peer system, could be used. Since the partition communication information contains the mechanism itself every partition paring can have a separate communication mechanism.

Servers are the computation nodes of the map graph. The mapping program assigns partitions to servers, and the servers perform the actual computations for the partitions of the map graph. The communications program receives parameters important to the applications running on the map graph. These parameters may comprise iteration time, communication time, latencies and other diagnostic information. A diagnostics element is associated with each partition. Each server communicates performance data after a configurable computation sequence to CP 250 for access by MP 240. Based on the performance data and rules engine 260, RMP 244 may re-calculate the map, exchanging collections between partitions to balance the server load. The re-calculation is performed in a layer below the application running on the map, and the application developer does not need to write any code to benefit from this functionality. The algorithms for managing the state of the cells, collections and partitions are all stored in abstract classes for the cell, collection and partition objects.

Each server executes a set of tests, which results in a machine profile written in XML. The machine profile is used to apportion the map over the set of available servers. The machine profile may contain different measurements such as maximum CPU speed, actual "loaded" CPU speed, network bandwidth, network latency, available memory, available disk, and floating point capability.

For example, a good rule for efficient execution of a computing problem may be that the time required to perform a computation iteration of all cells in a partition should be comparable to the time required to share results via edge cells at the collections perimeters. If a different server is processing each partition, the efficiency of the server depends on network bandwidth as well as processing power, memory, and possibly storage performance. In the absence of communication, faster servers would process partitions at a higher rate. But because the partitions (and therefore, the servers) may communicate, the fastest server can be at most N times cycles ahead of the slowest server, where N is the number of neighbors separating the fastest and slowest servers. Consequently, to compute the overall state of the cells as quickly as possible, it is necessary to keep the ratio of partition complexity to server capability as closely matched as possible.

Re-mapping is achieved by exchanging collections between grid nodes of the map graph. Each grid node handles one or more collections at a time. Re-mapping at the collection level of architecture rather than at the level of individual cells avoids inefficient accounting overhead. For example, a system that requires the computing power of a grid typically has a very large numbers of cells. It would be impractical to balance a grid of a thousand nodes, each with a million cells, if each cell were tracked and managed individually.

Figure 5C:
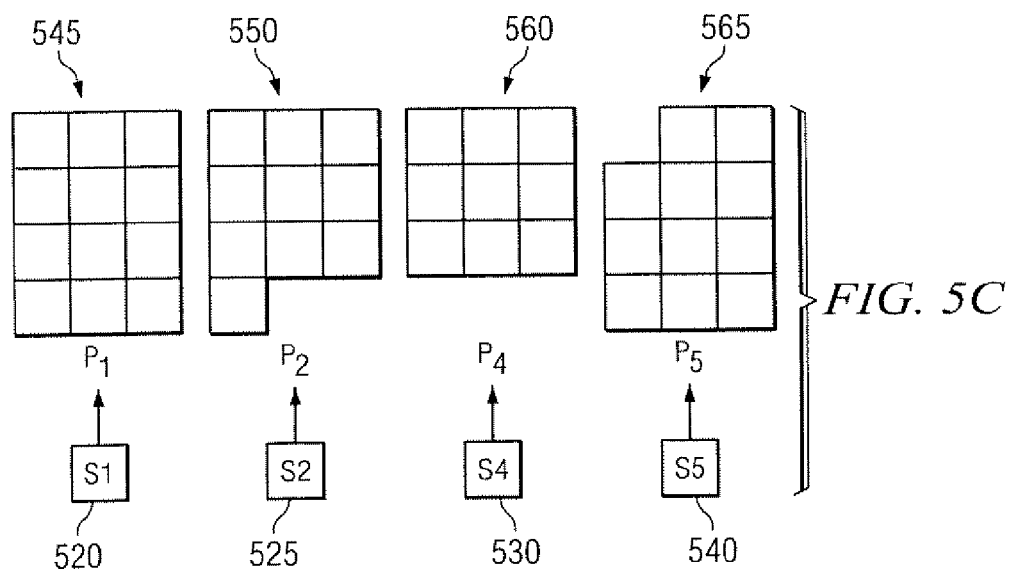
FIG. 5C is a depiction of the partition assignments after re-mapping.

Re-mapping is illustrated through FIG. 5C. At every program time step, the communication program measures parameters critical to map graph 230. While monitoring the performance of S1 520, S2 525, S3 530, S4 535, and S5 540, CP 240 notes that the performance of S5 540 and S4 535 has fallen below a threshold value. In addition, S3 530 has dropped offline. Meanwhile, S2 525 and S1 520 have more capacity than previously available. Consequently, OP 240 sends an instruction to RMP 244. Upon receipt of the instruction, RMP 244 shifts cells from S3 530, S5 540, and S4 535 to S1 520 and S2 525, balancing the load with server capacity as shown in FIG. 5C. P1 545 of S1 520 now has twelve collections. P2 550 of S2 525 has ten collections. P4 of S4 535 has nine collections. P5 565 of S5 540 now has ten collections. MP 240 dynamically changed the sizes of the partitions assigned to each server to maximize the computation resources available in accordance with instructions from rules engine 260.

Figure 6A:
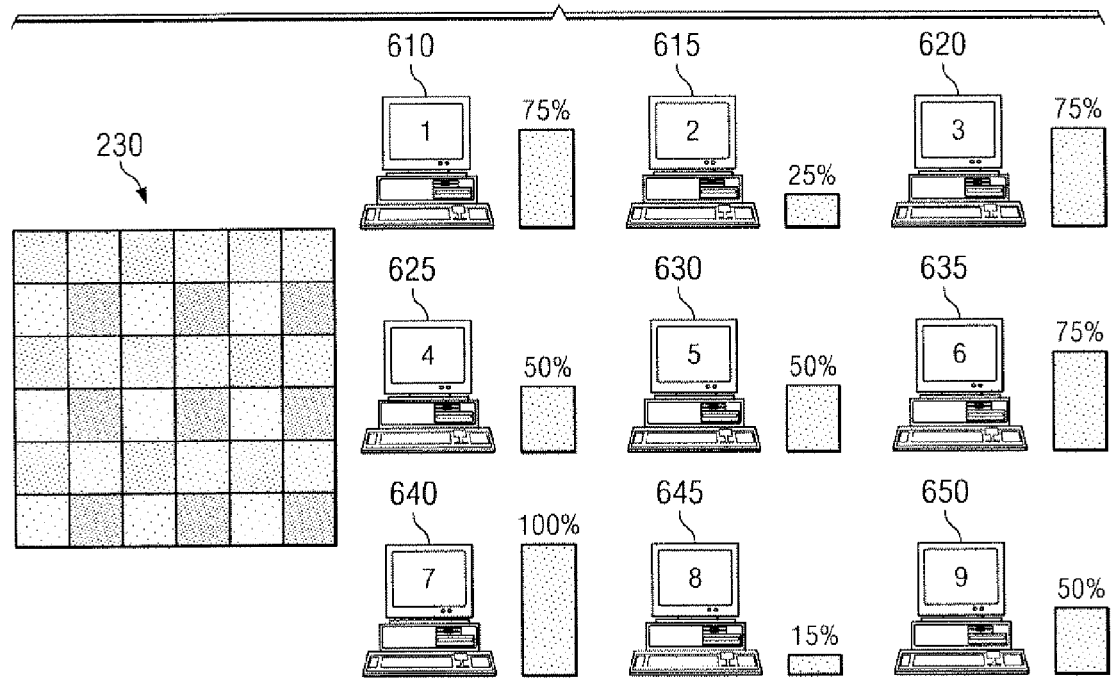
FIG. 6A is a depiction of a CPTS.
Figure 6B:
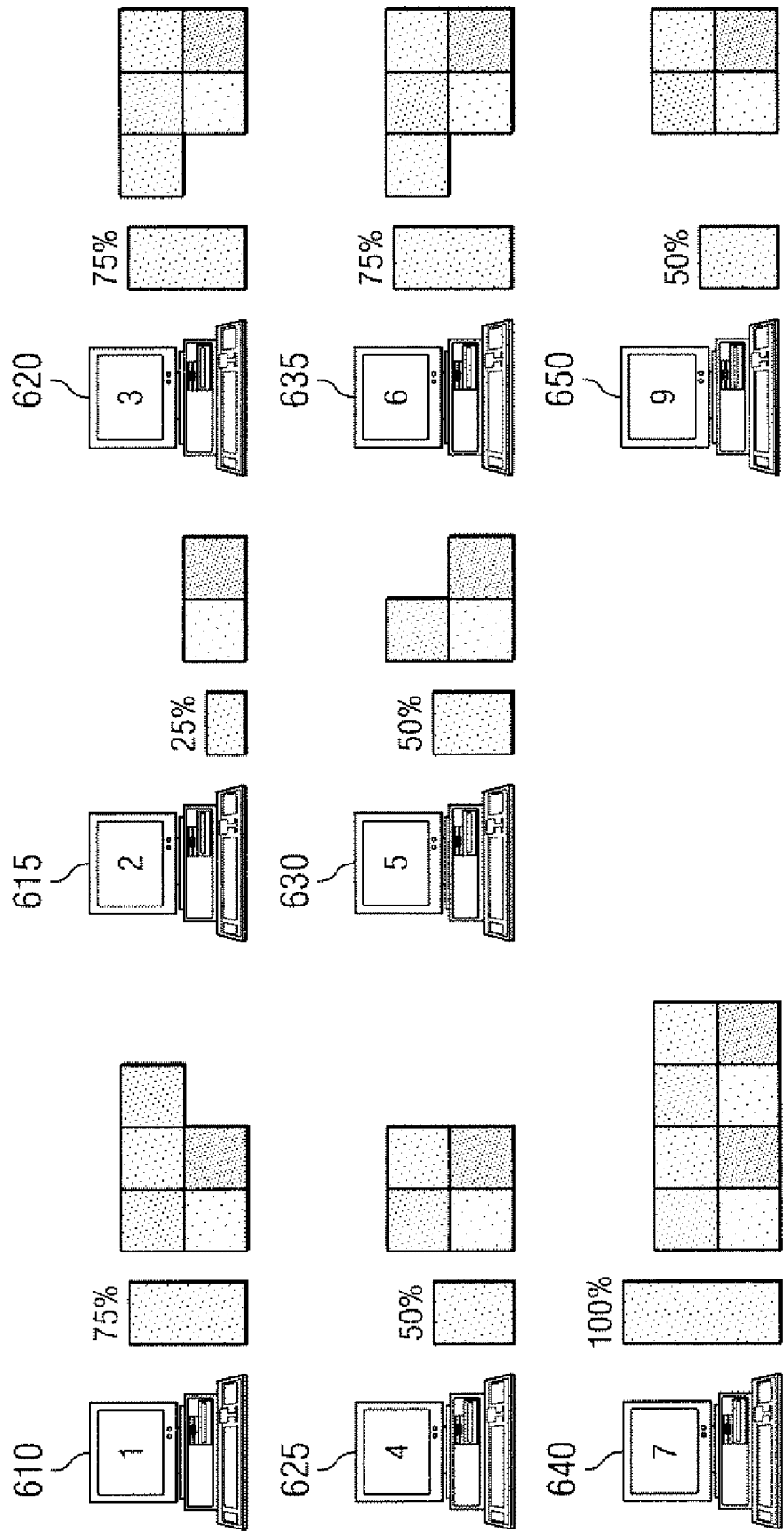
FIG. 6B is a depiction of a re-mapped CPTS.

FIG. 6A shows map graph 230 divided into cell collections. Map graph 230 has 36 collections assigned to nine servers 610, 615, 620, 625, 630, 635, 640, 645, and 650. FIG. 6A depicts a calculated T(c) for each server. In this example, T(c) is a calculated efficiency rating. T has been set to 50%. In this example, then, the threshold for comparison by CP 250 is 50%. Therefore, server 645 has a value that is less than the threshold (T(c)=15% and T=50%). Server 640, though, has the greatest capacity and can accept an increased load to make up for server 645. FIG. 6B shows the result of re-mapping. The 36 collections are now assigned to 8 servers, 610, 615, 620, 625, 630, 635, 640, and 650 with the partitions as shown.

Figure 7:
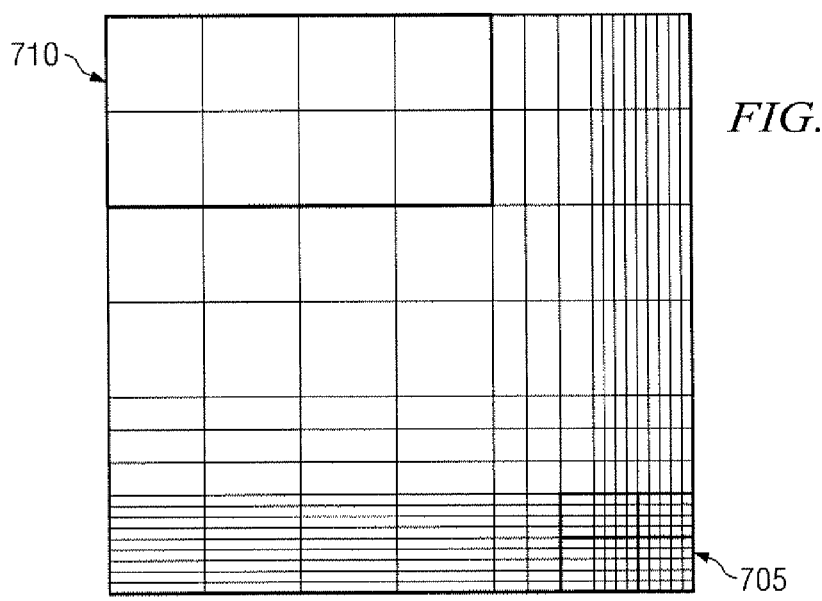
FIG. 7 is a depiction of re-mapping in response to a single high demand region.

FIG. 7 depicts an example of how re-mapping can alter map graph 230 in order to balance server load when activity concentrates in one geographical area. Cell density is higher in collection 705 than in collection 710. The cells and collections are smaller in collection 705 than in collection 710. The server assigned to each cell is, however, the same. Thus, the server assigned to collection 705 is processing data for a smaller area of the map graph. Since the map graph corresponds to a geographic map, the server assigned to collection 705 is processing data for a smaller area of the corresponding geographic map. The smaller area of the corresponding geographic map may be a stadium with a concentration of cell phone users or it may be an area of a game map where a large number of players have converged. By shrinking the geographic area assigned to a server, the number of cell phone users or the number of game players processed by the server can be reduced.

FIG. 8 is flow chart of the re-mapping program (RMP) 244. RMP 244 starts (802) and determines whether an instruction has been received from CP 250 (see FIG. 9). If an instruction has not been received, RMP 244 waits (842) a pre-determined time and proceeds to step 810. If an instruction has been received from CP 250, RMP 244 determines the applicable rules engine (820). RMP 244 then applies the rules engine to re-calculate the map graph and create a new map graph (830). The new map graph replaces the initial map graph so that the new map graph becomes the map graph for system 100 (see FIG. 1) (840). RMP 244 determines whether there is another instruction (850). If so, RMP 244 goes to step 820. If not, RMP 244 determines whether it should continue (860). If so, RMP 244 goes to step 810. If not, RMP 244 stops (870).

FIG. 9 is a flow chart of communication program (CP) 230. CP 230 starts (902) and determines whether a value for T has been entered (910). The system administrator determines a threshold value T. T may be based upon a factor such as an efficiency rating (such as in FIG. 6A), population density, velocity of client movement, or any other factor that the system administrator selects or calculates. If not, the default value for T is entered (912). If T has been entered, CP 230 monitors communications between partitions (920). CP 230 extracts data needed to calculate a threshold value T(c) from the monitored communications (930), and calculates T(c) (940). CP 230 compares T (c) to T (950). CP 230 determines whether T(c) is greater than T (960). If T(c) is not greater than T, CP 230 goes to step 920 and continues monitoring. If T(c) is greater than T, CP 230 sends an instruction to MP 244 to re-calculate the map graph (970). CP 230 determines whether a confirmation of re-calculation has been received from MP 244 (980). If confirmation has not been received, CP 230 waits (986) and then returns to step 980. If confirmation has been received that the map graph has been re-calculated, CP 230 then modifies the map address book (984). The map address book is modified to reassign the servers to partitions in accordance with changes made by the re-calculation. CP 230 then modifies the client address book to reassign clients to the proxy servers corresponding to the actual or virtual geographic area in which the client is located (986). A determination is made as to whether to continue (990). If CP 230 is to continue, then it proceeds to step 920. If not, CP 230 stops (992).

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. The present invention encompasses all equivalent relationships to those illustrated in the drawings and described in the specification. The novel spirit of the present invention is still embodied by reordering or deleting some of the steps contained in this disclosure. The spirit of the invention is not meant to be limited in any way except by proper construction of the following claims.

What is claimed is:

1. A method for balancing server work load in a client-proxy telecommunications system having location aware communication devices comprising the steps of:
    creating a map graph;
    monitoring a plurality of edge communications;
    extracting data from the edge communications;
    calculating a threshold T(c);
    comparing T(c) to a pre-established threshold T; and
    responsive to T(c) being greater than T, sending an instruction to a re-mapping program to cause a map graph to be re-calculated.

2. The method of claim 1 wherein the step of mapping the system further comprises the steps of:
    determining a number of partitions;
    determining a plurality of communication requirements; and
    creating a map graph having a plurality of cells, collections, and partitions.

3. The method of claim 2 wherein the step of creating the map graph further comprises the steps of:
    creating a first layer having cell-to-collection assignments;
    creating a second layer having cell-to-partition assignments;
    creating a third layer having communication-requirements-to-partition assignments; and
    creating a fourth layer having partition-to-server assignments.

4. The method of claim 2 further comprising the step of:
    responsive to receiving an instruction from a communication program, using a rules engine to create a new map graph.

5. The method of claim 4 further comprising the step, responsive to receiving confirmation that a new map graph has been calculated, modifying a map address book.

6. The method of claim 4 further comprising the step, responsive to receiving confirmation that a new map graph has been calculated, modifying the client address book.

7. The method of claim 1 wherein the step of creating a map graph further comprises:
    applying a template to a graph to create the map graph.

8. The method of claim 1 wherein the step of re-mapping the system further comprises:
    using a rules engine to re-calculate the map graph.

9. The method of claim 1 wherein the map graph is re-calculated using existing servers.

10. The method of claim 1 wherein the map graph is re-calculated to add a new server.

11. The method of claim 10 wherein the new server is added by creating a partition.

12. The method of claim 1 wherein the map graph is re-calculated to delete an existing server.

13. The method of claim 12 wherein the existing server is deleted by deleting a partition.

14. A method comprising:
    using a mapping program, creating a map graph for a client-proxy telecommunication system;
    using a communication program, creating a communication graph;
    responsive to an instruction from the communication program, performing actions comprising:
    creating a first layer having cell-to-collection assignments;
    creating a second layer having cell-to-partition assignments;
    creating a third layer having communication-requirements-to-partition assignments;
    creating a fourth layer having partition to server assignments;
    monitoring a plurality of edge communications;
    extracting data from the edge communications;
    calculating a threshold T(c);
    comparing T(c) to a pre-established threshold T; and
    responsive to T(c) being greater than T, sending an instruction to a mapping program to cause a map graph to be re-calculated.

15. The method of claim 12 further comprising the step, responsive to receiving confirmation that a new map graph has been calculated, modifying a map address book.

16. The method of claim 14 further comprising the step, responsive to receiving confirmation that a new map graph has been calculated, modifying the client address book.

17. The method of claim 14 wherein the step of creating a map graph further comprises applying a template to a graph to create the map graph.

18. The method of claim 14 wherein the step of re-calculating the map graph further comprises:
    using a rules engine to re-calculated the map graph.

19. A program product operable on a computer comprising:
a computer-usable medium;
wherein the computer usable medium comprises instructions for a computer to calculate a map graph having a first layer, a second layer, a third layer and a fourth layer;
wherein the first layer contains cell to collection assignments, the second layer contains cell to partition assignments, the third layer contains communication requirements to partition assignments, and the fourth layer contains partition to server assignments;
monitoring a plurality of edge communications;
extracting data from the edge communications;
calculating a threshold $T(c)$;
comparing $T(c)$ to a pre-established threshold $T$; and
responsive to $T(c)$ being greater than $T$, sending an instruction to a re-mapping program to cause a map graph to be re-calculated.

20. The program product of claim 19 wherein the step of calculating a map graph further comprises:
applying a template to a graph to create the map graph.

21. The program product of claim 19 wherein the step of re-calculating the map graph further comprises:
using a rules engine to re-calculate the map graph.

22. The program product of claim 19 further comprising the step of:
responsive to receiving confirmation that a new map graph has been calculated, modifying a map address book.

23. The program product of claim 19 further comprising the step of:
responsive to receiving confirmation that a new map graph has been calculated, modifying the client address book.

24. An apparatus comprising:
an internal network connecting a communication system, a mapping system and a plurality of applications and servers;
a proxy server connected to the internal network;
a plurality of clients connected to the proxy server by an Internet;
means for calculating a map graph comprising cells, collections and partitions and for re-calculating the map graph when a calculated threshold $T(c)$ exceeds a threshold $T$; and
means for creating a communication graph.

25. The apparatus of claim 24 further comprising means for modifying a map address book.

26. The apparatus of claim 24 further comprising means for modifying a client address book.

27. The apparatus of claim 24 further comprising a template.

28. The apparatus of claim 24 further comprising a rules engine.

29. A system comprising:
an internal network connecting a communication system, a mapping system and a plurality of applications and servers;
a proxy server connected to the internal network;
a plurality of clients connected to the proxy server by an Internet;
means for mapping a graph and creating a map graph; and
means for automatically re-mapping the system when a threshold value has been exceeded;
wherein the map graph further comprises:
a first layer having cell-to-collection assignments;
a second layer having cell-to-partition assignments;
a third layer having communication-requirements-to-partition assignments; and
a fourth layer having partition-to-server assignments.

30. The system of claim 29 wherein the mapping system further comprises means for, responsive to receiving an instruction from a communication program, using a rules engine to re-calculate the map graph.

31. The system of claim 29 wherein the communication system further comprises:
means for monitoring a plurality of edge communications;
means for extracting a data from the plurality of edge communications;
means for calculating a calculated threshold;
means for comparing the calculated threshold to a threshold;
means for, responsive to the calculated threshold being greater than the threshold, sending an instruction to a re-mapping program to cause the map graph to be re-calculated; and
means for, responsive to receiving confirmation that a new map graph has been calculated, modifying the address book.

32. The system of claim 29 wherein the means for mapping a graph further comprises applying a template to a graph to create the map graph.

33. The system of claim 29 wherein the means for re-mapping the system further comprises using a rules engine to re-calculate the map graph.

34. The system of claim 29 further comprising:
means for a map address book; and
means for modifying the map address book.

35. The system of claim 29 further comprising:
a client address book; and
means for modifying the client address book.

36. The system of claim 29 further comprising means for re-calculating the map-graph using existing servers.

37. The system of claim 29 further comprising means for re-calculating the map graph to add a new server.

38. The system of claim 37 further comprising means for adding a new server by creating a partition.

39. The system of claim 29 further comprising means for re-calculating the map graph to delete an existing server.

40. The system of claim 39 further comprising means for deleting the existing server by deleting a partition.

* * * * *